Sept. 27, 1932.  F. M. ROEHL  1,879,951
DOUGHNUT FORMER
Filed Nov. 12, 1928  6 Sheets-Sheet 1

Inventor
Frank M. Roehl
By Bradbury & Canwell
Attorneys

Sept. 27, 1932.  F. M. ROEHL  1,879,951
DOUGHNUT FORMER
Filed Nov. 12, 1928  6 Sheets-Sheet 2

Inventor
Frank M. Roehl
By Bradbury & Caswell
Attorneys

Sept. 27, 1932.  F. M. ROEHL  1,879,951
DOUGHNUT FORMER
Filed Nov. 12, 1928   6 Sheets-Sheet 3

Inventor
Frank M. Roehl
By Bradbury & Carwell
Attorneys

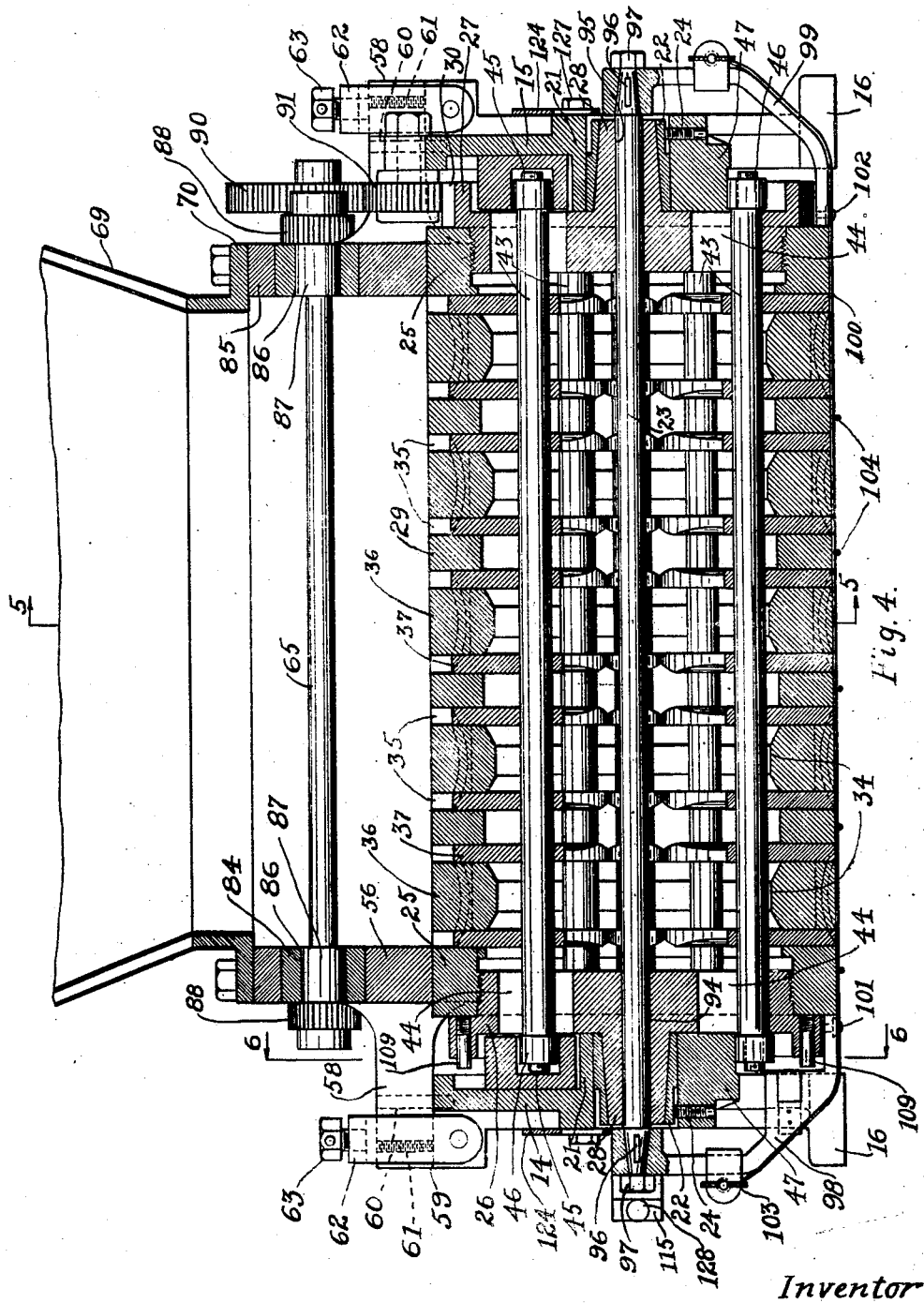

Sept. 27, 1932.  F. M. ROEHL  1,879,951
DOUGHNUT FORMER
Filed Nov. 12, 1928  6 Sheets-Sheet 5

Inventor
Frank M. Roehl
By Bradbury & Caswell
Attorneys

Sept. 27, 1932.  F. M. ROEHL  1,879,951
DOUGHNUT FORMER
Filed Nov. 12, 1928   6 Sheets-Sheet 6

Inventor
Frank M. Roehl
By Bradbury & Caswell
Attorneys

Patented Sept. 27, 1932

1,879,951

UNITED STATES PATENT OFFICE

FRANK M. ROEHL, OF MINNEAPOLIS, MINNESOTA, ASSIGNOR TO NATIONAL AUTOMATIC DOUGHNUT MACHINE COMPANY, OF MINNEAPOLIS, MINNESOTA, A CORPORATION OF MINNESOTA

DOUGHNUT FORMER

Application filed November 12, 1928. Serial No. 318,840.

My invention relates to doughnut formers and has for its object to provide a device adapted to function in a manner to accurately apportion and form the doughnut dough in the desired size and shape.

An object of the invention resides in providing a frame structure having end frame members and in journaling therein a shaft having attached to the same end plates adapted to support a hollow cylinder.

Another object of the invention resides in forming the cylinder with a plurality of inwardly extending ribs and to construct the cylinder with a number of annular bores extending through the wall thereof and up to said ribs to form core members carried by said ribs.

A still further object of the invention resides in providing pistons reciprocable along said bores, said pistons being constructed with inwardly extending legs adapted to straddle said ribs and to be operable from within said cylinder.

A feature of the invention resides in forming said end plates with a number of radial slots and to mount for radial movement in said slots, rods extending through said cylinder, said rods having pivoted thereto the legs of said pistons.

A still further feature of the invention resides in mounting upon said end frame members a number of cams, said cams being adapted to engage rollers on the ends of said rods for moving said rods in a radial direction to reciprocate the pistons.

Another object of the invention resides in pivoting one of the cams to its end frame member and in providing a slide for adjustably swinging said cam about its pivot to vary the inward movement of the pistons so as to control the amount of dough deposited within the annular bores.

Another object of the invention resides in employing in conjunction with the cylinder a concave adapted to be adjustably and detachably mounted with respect to the frame structure.

A still further object of the invention resides in forming said concave with a feeding device and with a number of scrapers adapted to engage the surface of the cylinder for removing the surplus dough adhering thereto and in further providing said concave with ports for conducting the dough removed from the surface of the cylinder away from the same and for relieving the pressure in the feeding device.

With the foregoing and other objects in view, which will appear in the following description, the invention resides in the novel combination and arrangement of parts and in the details of construction hereinafter described and claimed.

In the drawings:

Fig. 4 is a longitudinal sectional view taken substantially on line 4—4 of Fig. 2.

Figure 5:
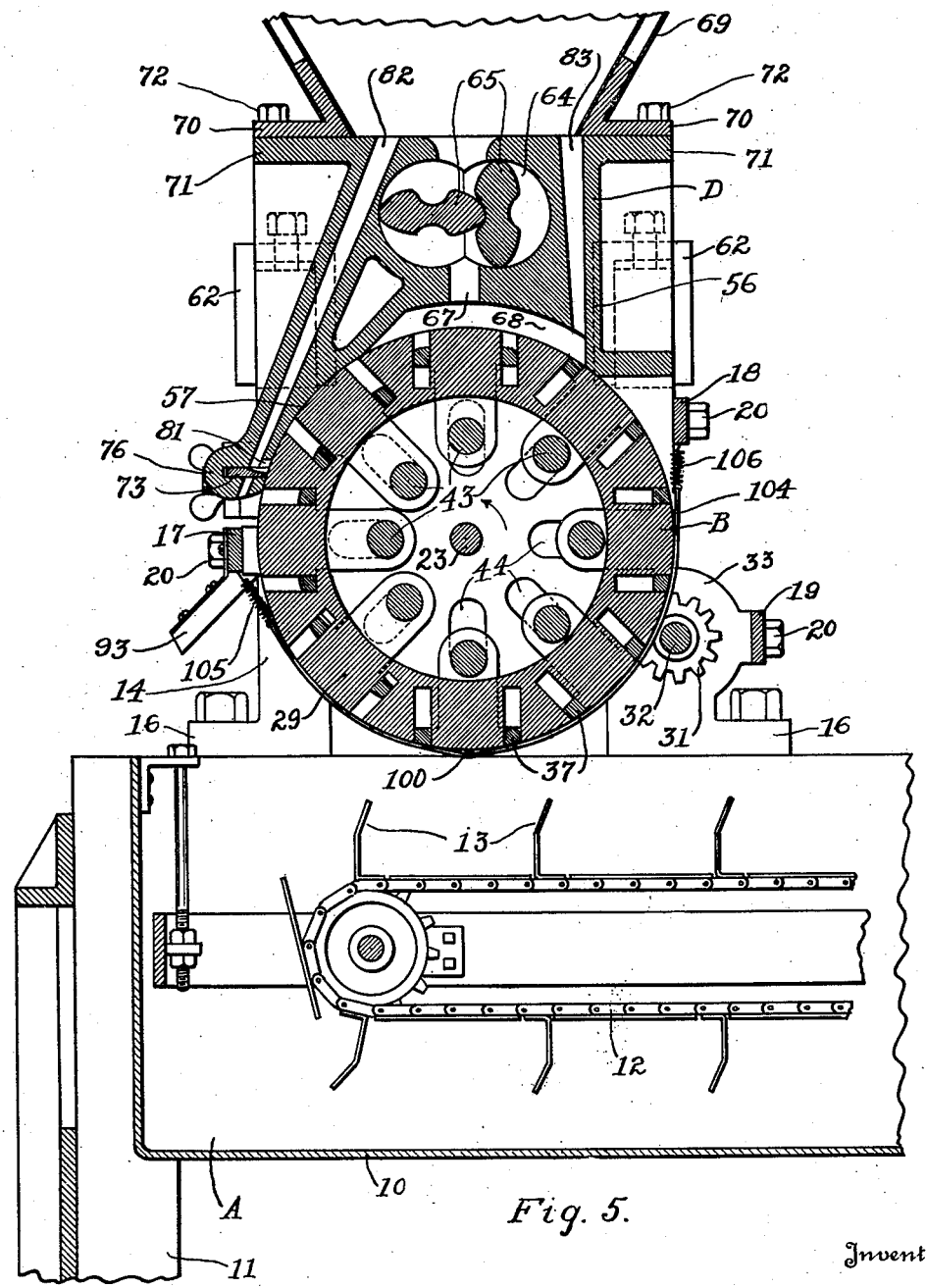
Fig. 5 is a transverse sectional view taken on line 5—5 of Fig. 4 and illustrating the device mounted upon a doughnut cooking machine.

Although my doughnut former may be used with any type of doughnut cooking machine, I have shown the same as applied to a device which I have indicated in its entirety at A in Fig. 5. This device comprises a tank or reservoir 10 for the reception of a liquid cooking medium, which tank is supported upon a frame structure 11. Within said tank is disposed a conveyor 12 formed with paddles 13 adapted to move the formed doughnuts entering the cooking liquid within the same continuously along said tank, while the same are being cooked through the agency of the heated cooking liquid therein. This particular construction forming no part of the instant invention has only been partially shown, though it can readily be comprehended that the device may be applied to any type of doughnut cooking device in which the doughnuts are removed from the point of discharge of the former.

My invention proper comprises primarily a cylinder B mounted for rotation in a framework C. A feeding device D superimposes the cylinder B and operates in conjunction therewith to feed the dough to the cylinder where the same is formed into the desired shape.

The framework C for supporting the various parts of the invention comprises two end frame members 14 and 15 which are formed with feet 16 adapted to rest upon the frame structure 11 of the cooking device A in a manner to support the feeder in a superimposed position over the head end of the tank A so as to discharge the formed doughnuts between the paddles 13 on said conveyor. These end frame members are connected together by means of a number of longitudinal bars 17, 18 and 19, which are attached thereto through bolts 20.

The cylinder B comprises a hollow elongated cylindrical shell 29 which is threaded at its two ends, as indicated at 25, to receive two end plates 26 and 27. These end plates are constructed with outwardly extending trunnions 28 which are of conical formation. Near the centers of the end frame members 14 and 15 are formed bosses 21 which are bored to receive conical bushings 22, which are rigidly held in place within said bosses by means of set screws 24. The bushings 22 form bearings for the trunnions 28 and serve to rotatably support the cylinder B.

The cylinder B is driven by means of a spur gear 30 which is formed on the end plate 27 and abuts against the end of the said cylindrical shell 29. This spur gear meshes with a pinion 31 rigidly attached to a driving shaft 32. The shaft 32 is journaled in bearings 33 formed on the end frame members 14 and 15 and may be driven from any suitable source of power in the ordinary manner. The speed of this shaft is governed by the speed at which it is desired to operate the cylinder B.

The cylindrical shell 29 forming a part of the cylinder B is constructed along the interior thereof with a plurality of spaced inwardly extending circumferentially disposed ribs 34. The said cylinder is further formed with a plurality of circumferentially disposed annular bores 35 which are centrally arranged with respect to the ribs 34 and which extend completely through the wall of the cylindrical shell 20 and up to said ribs. These annular bores provide pockets in the shape of a doughnut which are adapted to receive the dough in a manner to be presently described and form the same into the desired shape. The cores formed by the said annular bores, which I have indicated at 36, remain attached to the annular ribs 34 and are primarily supported thereon to maintain said pockets of fixed form and size. By means of this construction the said bores terminate at the ribs 34 but extend completely through the cylindrical shell 29 at both sides of said ribs. Operating within the bores 35 I provide a plurality of pistons 37 shown in detail in Fig. 8. These pistons comprise short annular portions 38 adapted to move within the annular bores 35 and are formed with inwardly extending legs 39 and 40 which are adapted to project inwardly within the cylinder proper and to straddle the ribs 34. The outer surfaces 41 of these pistons are ground cylindrical, as clearly shown in Fig. 8, so that when the said pistons are in their outermost position, the said surfaces are continuous with the outer cylindrical surface of the cylinder proper.

For the purpose of reciprocating the pistons 37, the bores 35 are arranged in longitudinal alignment. The legs 39 and 40 of each of the pistons 37 operating within said bores are drilled as indicated at 42 to receive operating rods 43 which extend completely through all of the pistons of a longitudinal row. These rods extend through radial slots 44 formed in the end plates 14 and 15, which slots in addition to permitting of radial reciprocal movement of said rods and pistons, also serve to guide the inner ends of the pistons to reduce side thrust of the pistons within the cylinders and to resist the lateral component of the force applied in reciprocating said pistons.

Figure 6:
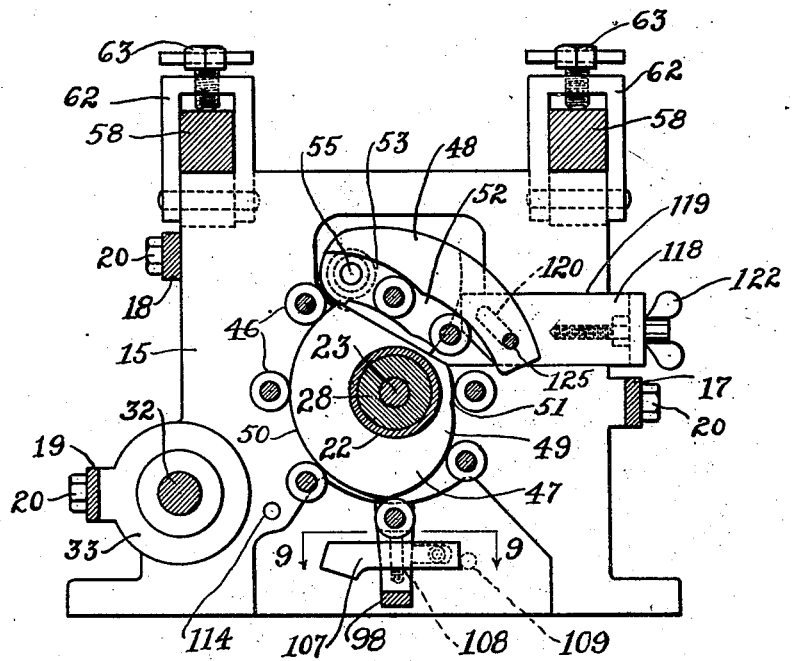
Fig. 6 is a transverse sectional view taken on line 6—6 of Fig. 4.

The various rods 43 are turned down at the protruding ends 45 thereof to rotatably support rollers 46. These rollers are each arranged to engage two cams 47 and 48, best shown in Fig. 6, one of each of said cams being attached to each of the end frame members 14 and 15 to cooperate with said rollers for simultaneously moving the rods 43 at both ends thereof. The cam 47 is fixed relative to the end frame member on which it is attached and is formed with a single spiralled cam surface 49 along which the various rollers may ride. This cam serves to move the pistons 37 from their innermost to their outermost positions, the said rollers riding along the circular surface 50 of said cam when in outermost position and along the circular portion 51 of said cam when in their extreme innermost positions. The cam 48 is formed with a double faced track 52 adapted to receive the rollers 46, which track is constructed with spiralled cam surfaces 53 arranged to move the pistons from their outermost to their innermost positions. Cam 48 is pivoted to the end frame section by means of a pin 55 situated at the outer end of the track 52 and permits of swinging the inner end of said track toward or from the axis of the cylinder B. The outer end of the track 52 is arranged to communicate with the cylindrical surface 50 of the cam 47 so that when the cylinder is rotated the rollers 46 travel without interruption from the surface 50 and into the track 52 regardless of the adjusted position of said cam 48. The adjustment of cam 48 serves to vary the extent of the inward movement of the pistons 37 and into the bores 35. This serves to regulate the size of the doughnut formed. It will be noted that due to the fact that cam 47 is formed with but a single cam surface, that the rollers 46 may leave the surfaces 49 and 51 of said cam when the cam 48 is adjusted to form light or small doughnuts. When the cam 48 is in its outermost position the rollers 46 upon leaving track 52, continue to travel in a circle with respect to the axis of cylinder B until the same strike the spiralled surface 49 of cam 47. This cam then moves the said rollers outwardly at the same time reciprocating the pistons 37 to their outermost positions. The rollers 46 are maintained in such course due to the friction of the pistons 37 within the bores 35, as well as the friction of the rods 43 along the radial slots 44.

For adjusting the cam 48 and holding the same in adjusted position, I employ two slides 118 which are slidably mounted in guideways 119 formed in the end frame members 14 and 15. These slides are constructed with inclined slots 120 adapted to receive pins 125 attached to the cam members 48 and movable through arcuate slots 126 in the frame members 14 and 15. Upon sliding the slides 118 along guideways 119, said pins and slots 120 in slides 118 cooperate to move said cams toward or from the axis of the cylinder B. The cams 48 have been illustrated in Fig. 6 in their innermost position. The slides 118 are operated through thumb screws 122 which are rotatably carried by brackets 123 and which are threaded into the end frame members 14 and 15. A pointer 124 secured to each of the cams 48 serves to indicate the exact adjustment of the said cams and at the same time provides a means whereby the cams may be locked in position. This is accomplished through nuts 127 screwed upon the pins 125 which lock the pointers 124 from movement and thereby hold the cams 48 in fixed position.

The feeding device D previously referred to serves to force the doughnut dough into the pockets formed by the bores 35 and the pistons 37 when in their innermost portion to form the raw doughnuts which are subsequently extruded from said pockets when the pistons are moved to their outermost positions. The construction of the feeding device D can best be shown in Figs. 4 and 5. This device comprises a casting 56 which I have designated in the specification as a concave and which is constructed with a concave surface 57 of the same curvature as the cylindrical shell 29 of cylinder B and which is adapted to rest upon the same. This concave is formed at the ends thereof with four lugs 58 which are adapted to be seated upon bearing surfaces 59 formed on the upper portions of the end frame members 14 and 15. The exact location of the said concave upon the cylinder is determined by means of dowel pins 60, while the clearance between the said concave and cylinder may be adjusted through an adjusting screw 61 threaded into the edge of each of the lugs 58 and engaging the corresponding bearing surface 59. The entire feeding device D is rigidly clamped in position upon the bearing surfaces 59 by means of a number of U-shaped clamps 62 pivoted to the end frame members 14 and 15 and provided with screws 63 for holding the parts immovable. By adjusting the screws 61 the clearance between the concave and cylinder may be adjusted at will and the concave may be lowered toward the cylinder as wear along the contacting surfaces of the cylinder and concave occurs.

Longitudinally disposed along the casting 56 I form a chamber 64 adapted to receive two rotary members 65 which operate in conjunction with one another similar to a gear pump to draw the dough from an inlet port into the chamber 64 and to discharge the same from said chamber and into a discharge port 67. The rotary members 65 are constructed to intermesh with one another and to follow along the wall of the chamber 64 in such a manner as to substantially prevent leakage of the dough past the same and so as to positively feed the dough from the inlet port and into the port 67. The dough upon leaving the port 67 enters a passageway 68 of such a size and form as to bring all of the pockets 35 along the upper portion of the cylinder in communication with the chamber 64. As the rotary members operate, the same force the dough into the said pockets where the raw doughnut is formed in the desired size and shape. The cylinder B travels in a counter clockwise direction, as viewed in Fig. 5 and as indicated by the arrow. It will be noted that the cams 47 and 48 are so designed and timed that the pistons 37 are retracted along the bores 35 prior to the said pockets coming in communication with the passageway 68 and that the same so remain until after the said pockets have passed from beneath the concave. The said cams are so timed and constructed that as soon as the pockets leave the concave the dough formed within the same is extruded by means of said pistons, said pistons being at their outermost positions when the same are immediately below the axis of the cylinder.

The method of supporting the rotary members 65 for rotation is best seen in Fig. 4. The chamber 64 which is noted in Fig. 5, is in the form of two intersecting cylindrical bores and extends completely through the concave 56. At the ends of these bores are tightly pressed two bushings 84 and 85 which are bored at 86 to form bearings for trunnions 87 turned on the ends of the rotary members 65. These trunnions extend through the bushings 84 and have secured to their protruding ends 200, spur pinions 88 and 89 at both ends thereof which serve to retain said rotary members in proper angular relation to one another. One of the trunnions 87 extends outwardly beyond its respective pinion and has attached to it a spur gear 90 which is adapted to mesh with a gear pinion 91 journaled on a stud 92. This pinion is secured to the end frame member 15 and also meshes with the gear 30, serving to effect a drive between the said gear and the feeding mechanism.

For the purpose of supplying the dough to the feeding device the same is constructed with a hopper 69 superimposing the concave 56. This hopper is constructed with flanges 70 which rest upon brackets 71 formed on the concave 56 and which are adapted to be attached thereto by means of bolts 72. The hopper 69 may be of any desired shape and is so designed as to communicate with the port 66 and to assist in delivering the dough to the same where the dough may be drawn into the chamber 64 by the rotary members 65. If desired, the walls of the hopper 69 may be constructed of two thicknesses of material as illustrated in Fig. 5, to serve in insulating the interior of the said hopper from the exterior so as to maintain the dough at its initial temperature in order to prevent the same from cooling and effecting the operation of the feeding device.

Figure 7:
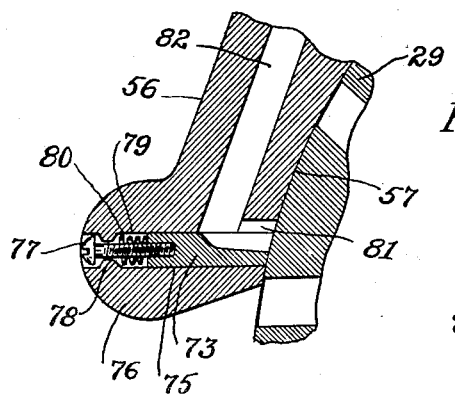
Fig. 7 is a fragmentary cross sectional detail view of a portion of the concave illustrating the construction of the cylinder scrapers.
Figure 3:
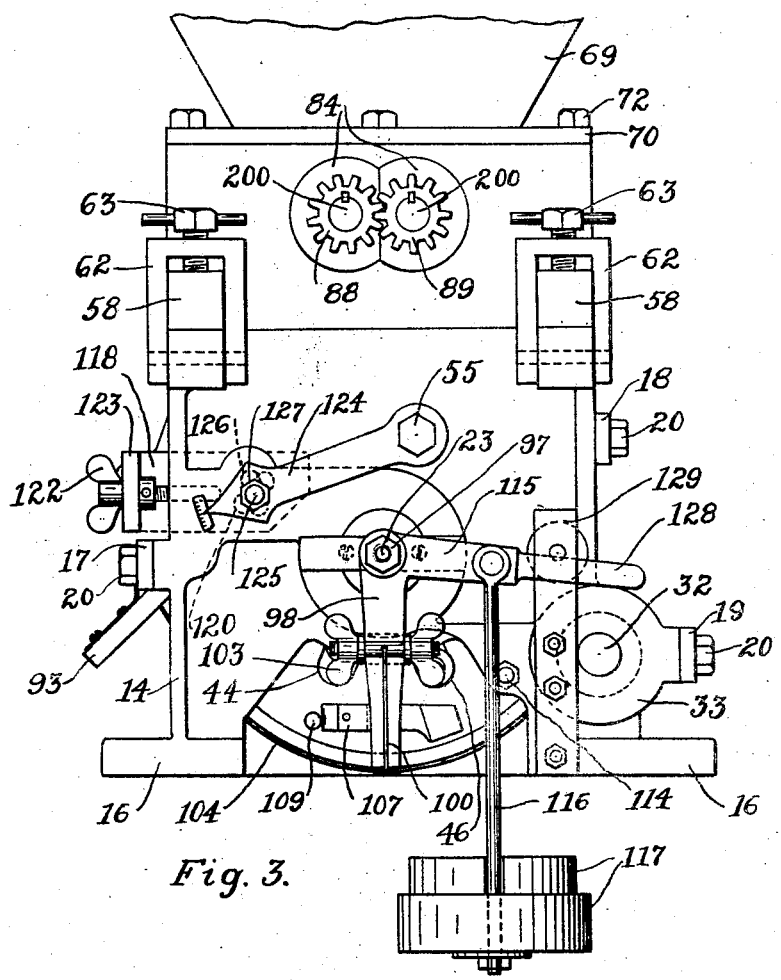
Fig. 3 is an end elevational view similar to Fig. 1 illustrating the machine from the opposite end.
Figure 10:
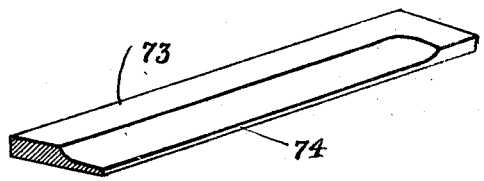
Fig. 10 is a perspective view of the cylinder scraper.

In the operation of the device a certain amount of dough adheres to the surface of the cylinder B and which, if not removed therefrom, would rapidly cake upon the cylinder and quickly render the device inoperable for any practical purpose. At the same time a considerable portion of the dough would leak past the edges of the concave 56 and merely go to waste. For the purpose of overcoming these difficulties, I employ a scraper 73 which is illustrated in detail in Figs 7 and 10. This scraper is in the nature of a long bar which is formed with a sharpened edge 74 extending to within a short distance of the same. The scraper 74 is mounted within a longitudinal slot 75 formed in a rib 76 disposed at the lower extremity of the concave 56 at the side of the same along which the pockets leave said concave. This slot extends completely through the concave surface 57 of the concave so that when the scraper 73 is disposed therein the sharpened edge 74 of said scraper comes in contact with the surface of the cylinder B. The scraper 73 is maintained within the slot 75 by means of screws 77 which extend through the rib 76 through openings 78 therein and are threaded into the scraper proper. The openings 78 adjacent the inner edge of the scraper 73 are enlarged as indicated at 79 to receive compression coil springs 80 which force the scraper inwardly against the surface of the cylinder. The screws 77 serve as stops for limiting the inward movement of the scraper and at the same time serve to retain the scraper within the slot when the concave is removed from the cylinder. The slot 75 is enlarged immediately above the scraper 73 as indicated at 81 to form a passageway which is adapted to communicate with a series of upwardly extending ducts 82 communicating with the space above the concave D and within the hopper 69. The dough removed by the scraper 75 is led into the passageway 81 by means of said scraper where the dough so removed escapes through the duct 82 and into the hopper proper. A similar duct 83 disposed on the opposite side of the concave 56 serves to relieve the pressure adjoining the edge of the concave and prevents leakage of the dough past the concave proper. Both the ducts 82 and 83 serve to relieve the pressure within the passageway 68 created by the rotary members 65 of the feeding device so that loss of material is almost entirely prevented. These ducts are of such dimensions that the same afford sufficient resistance to give the desired pressure within the passageway 68 and at the same time allow the surplus dough delivered to the said passageway to escape back to the hopper.

In addition to the scraper 73, I employ two scrapers 93 which are attached to the longitudinal frame member 17. These scrapers are arranged of angular formation and are arranged to engage the corners of the cylinder so as to remove the surplus dough leaking past the arcuate edge of the concave. These scrapers do not function to reclaim the dough so removed, but merely remove the surplus dough from the cylinder where the same is wasted. In actual experience but a small percentage of the dough leaks past the arcuate edge of the concave and the waste removed by said scrapers is exceedingly small.

Figure 1:
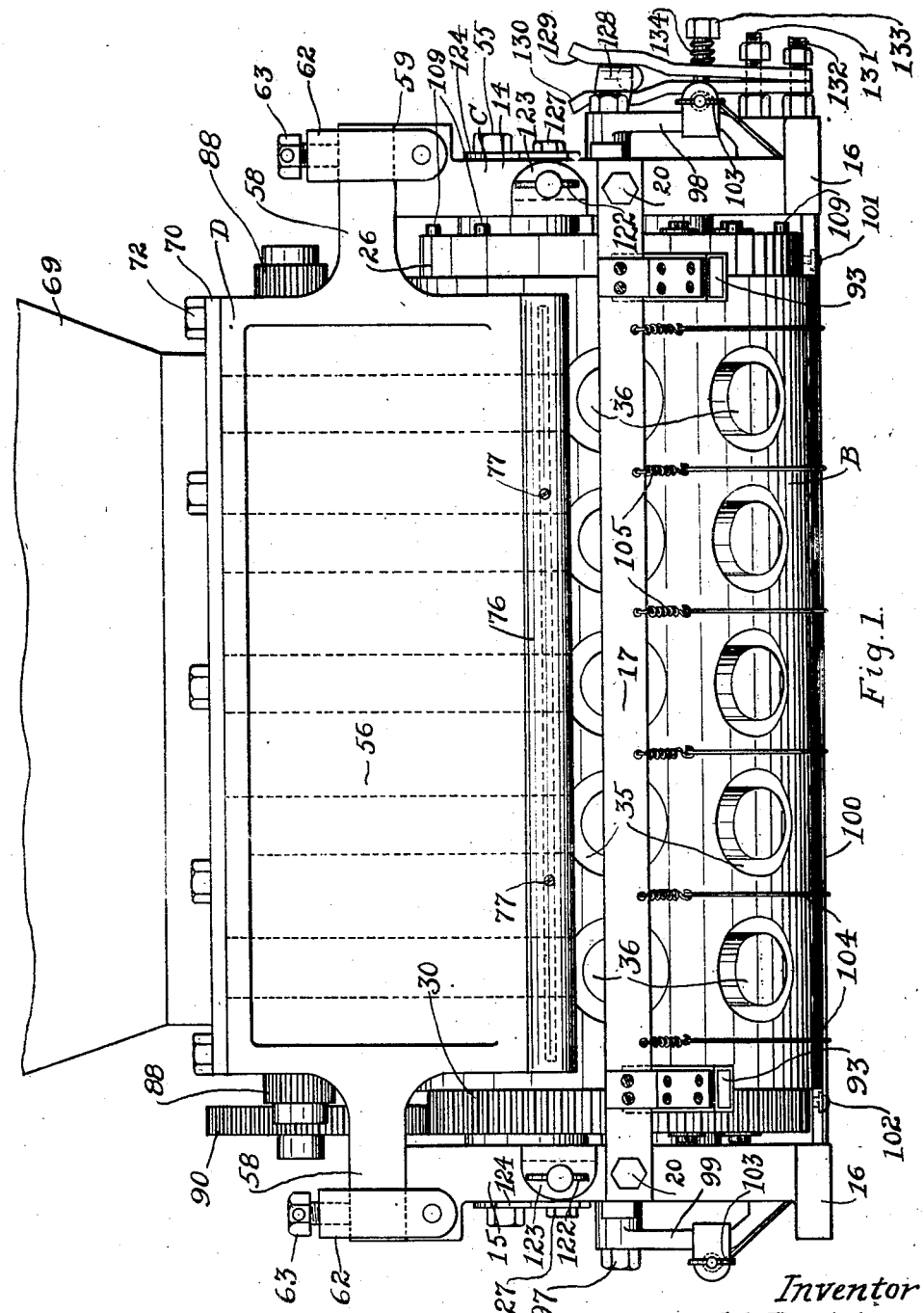
Fig. 1 is a side elevational view of a doughnut former illustrating an embodiment of my invention.
Figure 2:
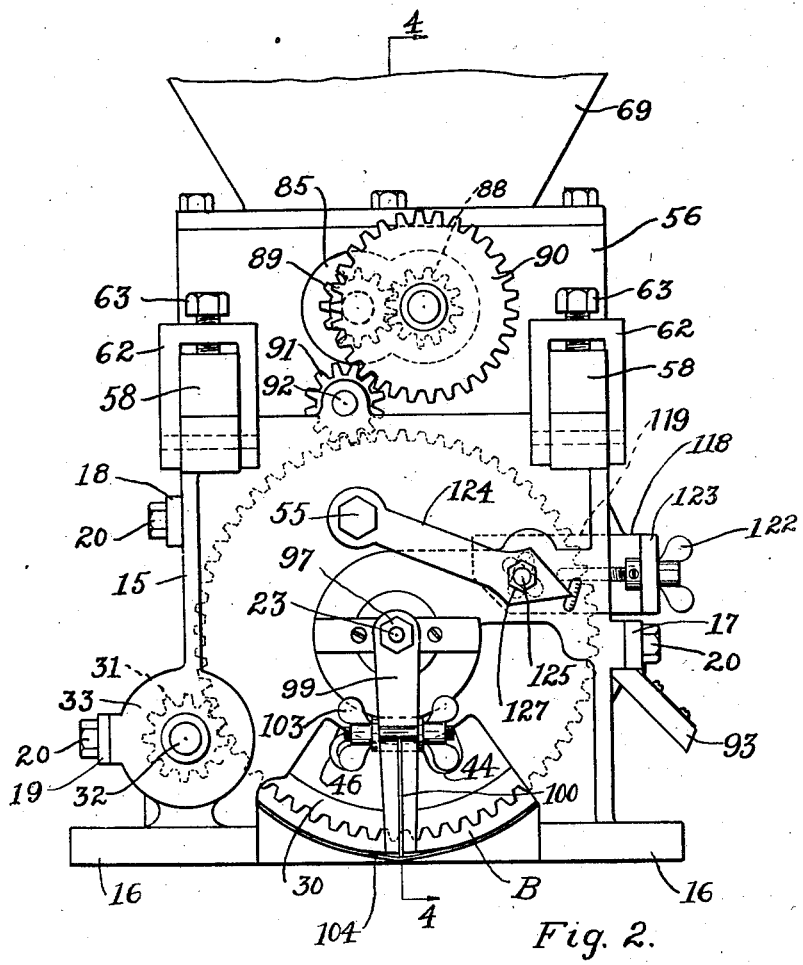
Fig. 2 is an end elevational view of the structure shown in Fig. 1 illustrating the transmission mechanism for operating the former.

In the formation of the doughnut, the dough being forced into the doughnut receiving pockets under considerable pressure, the same is caused to adhere to the surfaces 41 of the pistons 37 even after the same have been completely extruded from said pockets. To sever the doughnuts from said pistons, I employ a cutter which is best illustrated in Figs. 1, 3, 4 and 9. The trunnions 28 of the cylinder B are centrally bored at 94 and 95 to rotatably support a longitudinal shaft 23. This shaft extends outwardly beyond the end frame members 14 and 15 and has secured to it by means of keys 96 and cap screws 97, a pair of downwardly extending arms 98 and 99 which terminate in proximity to the periphery of the cylindrical shell 29 at the bottom of the same. A steel wire 100 is attached to the arm 98 by means of a screw 101 while the said wire is similarly attached to the arm 99 by means of a screw 102. This wire is further secured to a tightening device 103 by means of which the said wire may be drawn taut across the bottom of the cylinder B so as to sever the doughnuts from the pistons 37. For retaining the wire 100 in close contact with the surface of cylindrical shell 29, I employ a plurality of peripheral wires 104, Fig. 1 and Fig. 2, which are secured to the bars 17 and 18 through tension coil springs 105 and 106. Upon oscillating the shaft 23 the wire 100 is caused to move along the periphery of the cylinder B and is held in contact throughout its extent by means of the wires 104.

Figures 8, 9:
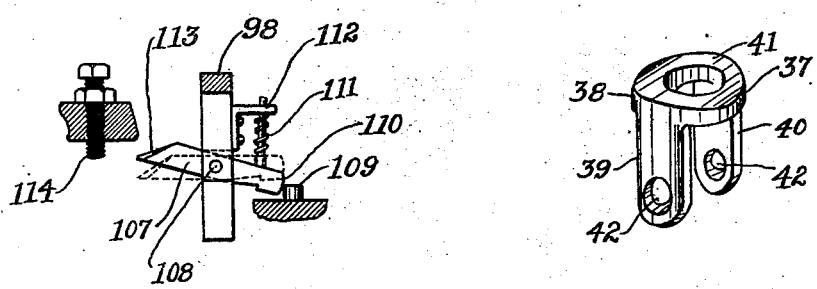
Fig. 8 is a perspective view of one of the pistons.
Fig. 9 is a fragmentary plan sectional view of the cutter release taken substantially on line 9—9 of Fig. 6.

For actuating the wire cutter 100, a dog 107 is employed which is pivoted to the arm through a pin 108 so as to oscillate in a direction toward and from the end plate 26 of cylinder B. Along the outer margin of this end plate is provided a plurality of outwardly projecting pins 109 which, when the dog 107 is oscillated to one of its extreme positions, as shown in Fig. 9, are adapted to engage the butt end 110 of said dog and to impart rotational movement to the cutter in the same direction as the travel of the cylinder B. A compression coil spring 111 seated at one end against the dog 107 and at its other end against a bracket 112 secured to arm 98 serves to hold the end 110 of dog 107 into position to be engaged by any of the pins 109. The other end of the dog 107 is formed with a cam surface 113 which is adapted to engage the end of an adjusting screw 114 threaded into the end frame member 14 and projecting in the path of movement of said cam surface. This screw serves to oscillate the dog 107 upon its axis and to disengage the butt end 110 thereof from engagement with the pin 109, allowing the cutter to be moved back toward its normal position. For causing such movement, the arm 98 is constructed with an outwardly extending lever 115 which has pivoted to it a depending rod 116 carrying one or more weights 117. These weights acting upon the lever 115 cause the shaft 23 to rotate rapidly in a direction reversed from the direction of rotation of the cylinder B. The reverse movement of the shaft 23 causes the wire cutter 100 to travel between the guide wires 104 in a manner to sever the doughnut from the cylinder. Upon the return movement of the cutter the cam surface 113 of dog 107 becomes disengaged from screw 114 and the end 110 of said cam is forced into engagement with the adjoining pin 109, there being the same number of pins as there are rows of doughnut pockets in the cylinder. As the cylinder continues to travel, the succeeding pin 109 moves the cutter along with the cylinder until the dog again engages the screw 114 and releases the cutter. For the purpose of braking the action of the cutter the extreme end of the lever 115, which is indicated at 128, is caused to move between two fingers 129 and 130 which are arranged to frictionally engage said lever end. These fingers are loosely mounted upon two studs 131 and 132 secured to the end frame member 14 and are yieldingly forced toward one another by means of a bolt 133 having a compression coil spring 134 positioned between the bolt head and the fingers 130. The fingers 129 and 130 are preferably made V-shaped so as to increase the friction upon the end 128 as the cut-off device reaches its extreme position.

My invention operates in a positive and effective manner to accurately form the doughnuts both as to size and shape. The cut-off device is actuated by the cylinder so that the same is in completed operation at exactly the proper time, thereby causing the formed doughnuts to be delivered at the required time. The device can be readily taken apart for cleaning and repairing and may be adjusted to compensate for wear. The bearings for the cylinder may be longitudinally adjusted through the set screws provided for the purpose to take up the wear on the bearings so that the machine may function properly at all times. The dough is positively forced into the doughnut pockets under pressure and insures a complete filling of the pockets. The pistons operating in the bores forming the doughnut pockets travel toward their innermost position while dough is being forced into the same. This precludes any possibility of the doughnut pockets being filled with air and insures the formation of a perfect doughnut of the desired shape and weight. By adjusting the cam slides any thickness of doughnut can be secured. Due to the ducts leading from the marginal portions of the concave and due to the scrapers operating in conjunction with the same, a minimum amount of waste material occurs, thereby greatly reducing the expense of operation of the machine.

Changes in the specific form of my invention, as herein disclosed, may be made within the scope of what is claimed without departing from the spirit of my invention.

Having described my invention, what I claim as new and desire to protect by Letters Patent is:

1. A doughnut former comprising a support, a cylinder journaled in said support and having a plurality of circumferentially disposed bores forming pockets for the reception of the dough, a plurality of pistons reciprocable radially along said bores, means including cam engaging members, for reciprocating said pistons, a cam member pivoted to said support and adapted to cooperate with said cam engaging member for moving said pistons into said bores, a second cam fixed relative to said support for moving said pistons outwardly along said bores, a slide movable along said support, and means applied between said slide and cam whereby said cam may be adjusted upon its pivot upon rectilinear movement of said slide.

2. A doughnut former comprising a rotatable cylinder formed with a plurality of pockets therein, a feeding device contacting with said cylinder, means for feeding the dough from said feeding device and into said pockets, a scraper for scraping the dough along the surface of said cylinder, a conduit for delivering the dough removed by said scraper back to said feeding device, and means for extruding the dough from said pockets.

3. A doughnut former comprising a rotatable cylinder formed with a plurality of pockets therein, a feeding device including a concave having a concaved surface adapted to contact with a portion of the surface of said cylinder, a passageway along said concave adapted to communicate with the pockets in said cylinder, means for feeding the dough through said passageway and into said pockets, a scraper disposed at the end of said concave and adapted to remove the surplus dough from the surface of said cylinder, a conduit extending away from the scraping edge of said scraper for leading the dough removed from the surface of the cylinder away from the same.

4. A doughnut former comprising a rotatable cylinder formed with a plurality of pockets therein, a feeding device including a concave having a concaved surface adapted to contact with a portion of the surface of said cylinder, a passageway along said concave adapted to communicate with the pockets in said cylinder, means for feeding the dough through said passageway and into said pockets, a scraper disposed at the end of said concave and adapted to remove the surplus dough from the surface of said cylinder, a conduit extending away from the scraping edge of said scraper for leading the dough removed from the surface of the cylinder away from the same, and additional conduits at the other end of said concave for leading away dough tending to leak past said concave and along the surface of said cylinder.

5. A doughnut former comprising a rotatable cylinder formed with a plurality of pockets therein, a feeding device including a concave having a concave surface adapted to contact with a portion of the surface of said cylinder, a passageway along said concave adapted to communicate with the pockets in said cylinder, means for feeding the dough through said passageway and into said pockets, and conduits formed along the longitudinal edges of said concave for leading away the dough tending to leak past said concave and along the surface of said cylinder.

6. A doughnut forming machine comprising a cylinder having pockets therein, a feeding device contacting with a portion of the surface of said cylinder terminating in longitudinal and peripheral contacting edges for filling said pockets with dough, means along the longitudinal edges of said feeding device for removing the surplus dough from said cylinder and delivering the same back into said feeding device, and scrapers positioned along the exterior of said cylinder at the corners thereof for removing the surplus dough leaking past the peripheral edges of said feeding device.

7. A doughnut former comprising a hollow cylinder formed with an internally disposed rib, said cylinder being provided with a plurality of circumferentially arranged annular bores extending completely through the wall of said cylinder and up to said rib to form core members, said core members being supported on said rib, pistons reciprocable along said bores, said pistons having portions integral therewith and extending into the interior of said cylinder, and means within the interior of said cylinder for engagement with said inwardly extending piston portions to reciprocate said pistons.

8. A doughnut former comprising a hollow cylinder formed with an internally disposed rib, said cylinder being provided with a plurality of circumferentially arranged annular bores extending completely through the wall of said cylinder and up to said rib to form core members, said core members being supported on said rib, pistons reciprocable along said bores, legs formed on said pistons and extending through said bores and straddling said rib, and means engaging said legs for reciprocating said pistons.

9. A doughnut former comprising a hollow cylinder formed with an internally disposed rib, said cylinder being provided with a plurality of circumferentially arranged annular bores extending completely through the wall of said cylinder and up to said rib to form core members, said core members being supported on said rib, pistons reciprocable along said bores, legs formed on said pistons and extending through said bores and straddling said rib, rods pivoted to the legs of said pistons for reciprocating said pistons, rollers attached to the ends of said rods, and a cam for engagement with said rollers for reciprocating said pistons.

10. In combination, a rotatable cylinder, a member seated against a portion of said cylinder, means for feeding a plastic substance against said cylinder and within said member, said member having a duct formed therein along the surface thereof contacting with said cylinder, said duct communicating with said feeding means for returning plastic substance approaching said edge of said member back to said feeding means.

11. In combination, a rotatable cylinder, a concave having a concave surface seated against a portion of said cylinder, said concave having an opening communicating with the surface of said cylinder, means for feeding a plastic substance through said opening and against said cylinder, said concave having a duct formed in the concave surface thereof at a point adjacent one of the outer edges of said concave for returning the plastic substance passing one of the edges of said concave at said opening back to said feeding means.

12. The combination with a doughnut former comprising a support, a cylinder journalled in said support and having a plurality of circumferentially disposed bores forming pockets for the reception of the dough, a plurality of pistons reciprocable radially along said bores, and means including cam engaging means for reciprocating said pistons, of a fixed cam and a cam member pivoted at one end for operating said cam engaging means, a slide member movable past the movable end of said pivoted cam member, one of said members having a slot and the other a pin for engagement therewith for swinging said cam member upon reciprocation of said slide member.

13. A doughnut former comprising a hollow cylinder formed with an internally disposed rib, said cylinder being provided with annular pockets of an internal diameter greater than the width of said ribs and centered thereon, said pockets extending completely through the wall of said cylinder to leave segmental openings on either side of said rib, tubular pistons disposed within said annular pockets, said pistons having slots across the same to form segmental legs adapted to extend through said segmental openings and into the interior of the cylinder, and means within the cylinder engaging said legs for operating said pistons.

14. A doughnut former comprising a hollow cylinder having a circumferentially arranged rib within the same, said cylinder being formed with an annular bore extending through the wall of said cylinder and up to said rib, the rib being centrally disposed with respect to said bore, a piston of a diameter to fit within said bore and of substantially the same diameter throughout its length, said piston having a slot extending through the same to form spaced legs on said piston adapted to straddle said rib when said piston is disposed within said annular bore, and means for engaging the legs on said piston for reciprocating the same within said bore.

15. A doughnut former comprising a frame structure having end frame members, a shaft journalled in said end frame members, end plates secured to said shaft, a hollow cylinder attached to said end plates and formed with an internally disposed rib, said cylinder being provided with a number of radial bores, pistons slidable within said bores, said pistons having pairs of inwardly projecting portions straddling said rib, said portions being spaced from one another throughout their extent, rods passing jointly through said portions, said end plates having radial slots for the guiding of said rods for radial movement, rollers secured to the ends of said rods, and cams engaging said rollers for moving said rods along said slots to reciprocate said pistons.

In testimony whereof I have affixed my signature to this specification.

FRANK M. ROEHL.